S. MALES.

Cider-Mill.

No. 6,504. Reissued June 22, 1875.

Attest

Edgar J. Gross

John E. Jones

Inventor

Samuel Males

By F. Millward

Attorney

THE GRAPHIC CO. PHOTO-LITH. 39 & 41 PARK PLACE, N.Y.

UNITED STATES PATENT OFFICE.

SAMUEL MALES, OF CINCINNATI, OHIO.

IMPROVEMENT IN CIDER-MILLS.

Specification forming part of Letters Patent No. 52,583, dated February 13, 1866; reissue No. 5,877, dated May 19, 1874; reissue No. 6,504, dated June 22, 1875; application filed May 11, 1875.

*To all whom it may concern:*

Be it known that I, SAMUEL MALES, of Cincinnati, Hamilton county, State of Ohio, have invented certain new and useful Improvements in Cider-Mills, of which the following is a specification:

My invention consists in a certain construction and arrangement of intermeshing rollers, by which they are made to mutually assist each other in feeding the apples and retaining the broken pieces until effectually crushed between the segments of said rollers, the rollers being also fitted with gear-wheels which clear each other, thus maintaining them in complete efficiency.

My invention further consists in such a relative arrangement of the teeth of the gear-wheels and the ribs and grooves of the crushing-rollers that at one or more points in the peripheries they shall register in line one with the other, so that the operator, after having the machine apart, may, by noticing the point or points where a rib and groove of the rollers are in line with a tooth and space of the gear-wheels, put them together at such point, and not have to resort to marks, or run the risk of breakage, by getting them together in improper relation.

Figure 1:
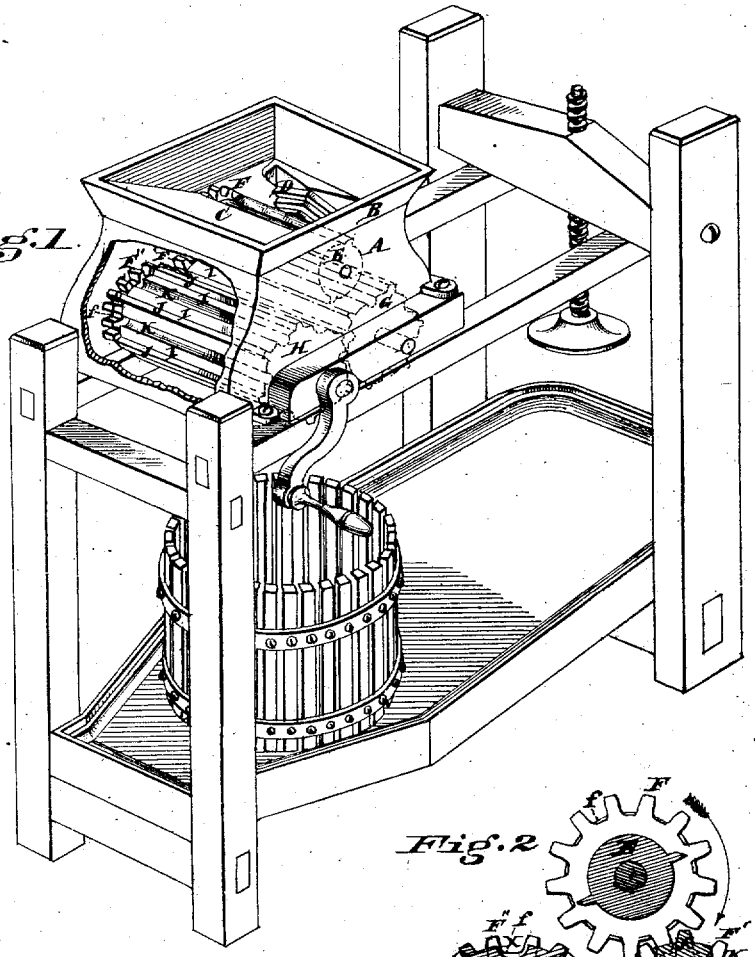
Figure 4:
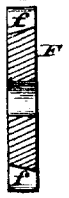
Figure 2:
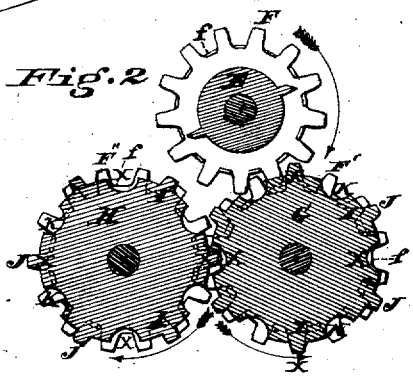
Figure 3:
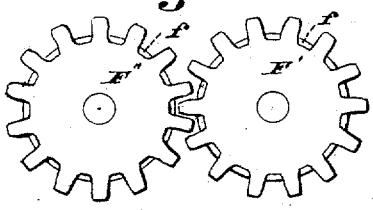

Figure 1 is a perspective view of a cider-mill, embodying my invention. Fig. 2 is a transverse section of my rollers. Figs. 3 and 4 are an end view and section, respectively, of the gear-wheels, showing the chamfered bottom of the teeth.

A represents a customary inclosing-box, surmounted by a suitable hopper, B, whose chute C conducts the apples between a corrugated throat, D, and a breaking and feeding roller, E. One end of the roller E is furnished with cogs F, which cogs gear into similar cogs F′ on one of the crushing-rollers, whose cogs also gear into similar cogs F″ on the end of a precisely similar crushing-roller, H. The periphery of each crushing-roller G and H is composed of a number of cylindrical segments, I, armed along the middle with ribs J, separated from each other by grooves K. Each rib J of one roller enters and sweeps around one of the grooves K in the other roller, and each rib J catches the broken pieces as they fall from the roller E, and as it enters into the groove K in the other roller holds the apple between the segments I, so that the apple is necessarily crushed between the segments, and the cells thoroughly broken, more cider being thereby produced than can be obtained by the grating process. The rollers H and G being both provided with ribs and grooves, great efficiency in the feeding and discharging process is obtained, requiring necessarily but a slight projection of rib and depth of groove, and crushing is done in the grooves as well as between the segments. The gear-wheels F F′ F″ being, when the hopper is located as shown in the drawing, inside of the line of the hopper, I construct the teeth so that the bottoms *f* of the intermediate spaces are chamfered or sloped outward, so as to be deeper on the outside, and thus afford a way of escape for pomace falling between or upon the cogs, and the said chamfered spaces enable the cogs of one roller to clean the spaces of the other. The rollers H and G, with their gear-wheels F′ F″, are cast or otherwise secured firmly to their shafts in such a manner that at one or more points, X, in the periphery of each roller a rib or groove on the roller will be exactly in line with a tooth or space in the gear-wheel. In the drawing, (see Fig. 2,) four such points on each roller agree in this way. In putting the machine together it is simply necessary to bring one of these registering-points in the periphery of one roller opposite one of the registering-points in the opposite roller, and the ribs and grooves will be found to match properly in the motion of the rollers, and thus the marking of the gear-wheels before the machine is taken apart is obviated, and there is no danger of getting the rollers together out of proper relation.

In machines made heretofore the gear-wheels of the crushing-rollers have usually been placed upon the shafts at points outside of the frame of the machine, so that the driving-force had to be communicated through the journals of the rollers, which, being small, were subjected to torsional strains liable to affect the proper relation of the crushing devices.

My gear-wheels are formed upon or secured to the ends of the rollers, and are therefore mounted and operated inside of the journals, so that in the driving of these rollers one by the other the journals are not subjected to torsional strains, and therefore no tendency exists for such a straining of the parts as to interfere with the proper relation between the ribs and grooves of the crushing-rollers. In addition to this I place or form a gear-wheel upon the same end of the feeding-rollers E as the gear-wheels upon the crushing-rollers, so that the three rollers may be directly geared to each other, and all at one end, thus avoiding the torsional effect of driving at one end, and gearing at the other.

The mill being started, and apples being fed into the hopper, the said apples are carried down the chute C between the corrugated throat D and feed-roller E, between which they are broken into small pieces, and from which they drop on rollers G and H, whose ribs J catch and hold the fragments, and cause the segments of the coacting rollers to crush all the cells of the pomace; at the same time the ribs J act to completely strip the said pomace from said surfaces I and from the grooves K, so as to preserve the full efficiency of these parts at each succeeding revolution.

I claim—

1. The crushing-rollers H G, provided with cylindrical segments I, ribs J, and grooves K, substantially as and for the purpose specified.

2. In combination with the crushing-rollers H and G and break-roller E, the gear-wheels F F′ F″, with interdental spaces, whose bottoms *f* are chamfered or sloped outward, substantially as and for the purpose specified.

3. The herein-described relative arrangement between the gear-wheels and crushing-rollers—that is to say, having at least one rib of one roller register with a tooth on its gear-wheel, while at least one groove in the other roller registers with a space between two adjacent teeth of its gear-wheel, all substantially as and for the purpose specified.

SAMUEL MALES.

Witnesses:
JOHN E. JONES,
EDGAR J. GROSS.